Aug. 19, 1969     T. L. F. BOYA ET AL     3,462,733
RIGHT-OF-WAY SIGNALLING SYSTEM FOR VEHICLES
Filed Oct. 5, 1966
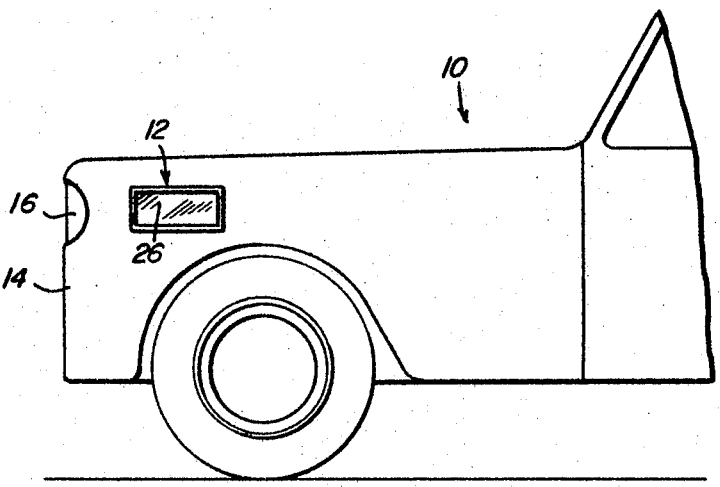
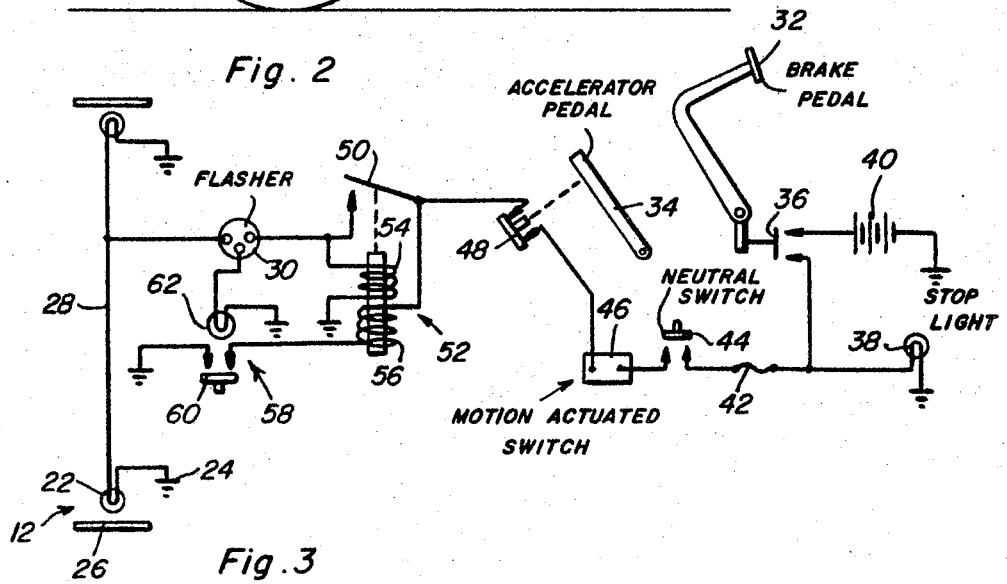
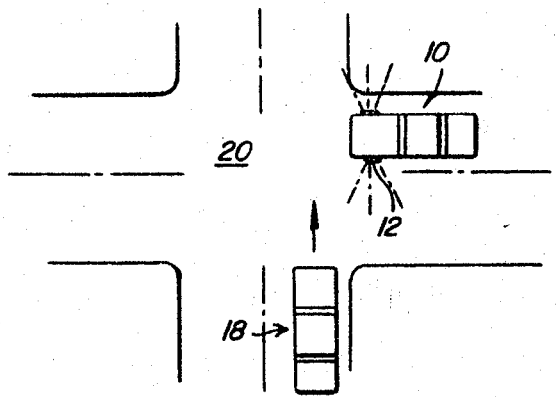
Theodore L. F. Boya
Harry Burger, Jr.
INVENTORS

# United States Patent Office 3,462,733
Patented Aug. 19, 1969

3,462,733
RIGHT-OF-WAY SIGNALLING SYSTEM FOR VEHICLES
Theodore L. F. Boya, Robstown, Tex. (3516 3rd St., Brownwood, Tex. 76801), and Harry Burger, Jr., P.O. Box 785, Robstown, Tex. 78380
Filed Oct. 5, 1966, Ser. No. 584,530
Int. Cl. B60q 1/50, 1/44
U.S. Cl. 340—54          15 Claims

ABSTRACT OF THE DISCLOSURE

Signal lamps mounted on the front fenders of a vehicle emit laterally directed signals to inform other motorists that it is safe to pass the intersection adjacent to which the vehicle emitting the right-of-way signals has stopped. An illuminated push-pull button switch actuated by the driver sets the signal lamps into operation. Right-of-way signalling is cancelled by release of the brake pedal, actuation of the accelerator, or movement of the vehicle.

---

This invention relates to a safety signalling system for automotive vehicles and more particularly to a signal system through which a motorist may signal a right-of-way vehicle to proceed through an intersection.

The signalling system of the present invention is designed to avoid vehicle collisions at intersections. Toward this end, motorists in vehicles equipped with the signalling system will be capable of indicating to motorists in other vehicles that they may proceed through the intersection if the vehicle from which the signal originates, has stopped or is under complete control of the vehicle operator. Flashing signal lamps are accordingly mounted on the vehicle in accordance with the present invention adjacent the forward end and laterally thereof at the level of the headlights so that they will be visible to motorists in vehicles approaching in directions at right angles to the vehicle on which the signal lamps are flashing.

Thus, the signalling system in accordance with the present invention will be operative under selective control only if the vehicle brakes are applied, the signalling lamps being cancelled once the vehicle brakes are released. Also, the signalling lamps are mounted on the sides of the vehicle fenders for example so that they will not be confused with the turn signal lamps which are mounted and viewed from the front or rear of the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial side elevational view of a typical automotive vehicle on which the right-of-way signalling devices are mounted.

FIGURE 2 is an electrical circuit diagram illustrating the signalling system of the present invention.

FIGURE 3 is a simplified top plan view illustrating a typical situation in which the right-of-way signalling system is utilized.

Referring now to the drawings in detail, FIGURE 1 illustrates an automotive vehicle 10 on which right-of-way signalling lamp devices 12 are mounted adjacent the forward end 14. As shown, the signalling device 12 is mounted on the front fender substantially at the level of the front headlight 16. Since the signalling device 12 is mounted on either lateral side of the vehicle, it may be readily visible to a motorist in a vehicle 18 for example as shown in FIGURE 3 approaching intersection 20 in a direction at right angles to the vehicle 10. The signalling devices 12 may therefore be flashed under control of the vehicle driver in order to signify to the driver of vehicle 18 that it is safe to proceed through the intersection. However, only if the vehicle 10 is under complete control of the driver will the signalling system be operative.

As shown in FIGURE 2, each of the signalling devices 12 includes a filament lamp 22 through which an energizing circuit may be completed to ground 24 in order to emit light through a green colored lens 26. Both of the lamps 22 are therefore interconnected by conductor 28 to which electrical voltage may be supplied through a flasher unit 30 in order to produce a blinking or flashing signal.

With continued reference to FIGURE 2, it will be observed that the signalling system is associated with the usual controls of an automotive vehicle including the brake pedal 32 for actuating the vehicle braking system and the accelerator pedal 34 through which supply of fuel to the vehicle engine is controlled. As is well known, actuation of the brake pedal to stop the vehicle also closes the normally opened stop switch 36 to thereby connect the rearwardly mounted stop light 38 to the vehicle's source of electrical energy such as the vehicle battery 40. It will become apparent therefore, that only when the stop light 38 is energized upon actuation of the brake pedal 32, will the signalling system be operative, release of the brake pedal being operative through the stop switch 36 to cancel operation of the signalling lamps 22. The vehicle battery or source of voltage 40 is therefore electrically connected to the signalling lamps 22 upon closing of the signal cancelling stop switch 36 through the fuse 42 and any other controls that may be incorporated into the signalling system to insure that the signalling system will operate only when the vehicle is under complete control of the driver. By way of example, FIGURE 2 illustrates three switches connected in series including a neutral switch 44, a motion actuated switch 46 and an accelerator pedal control switch 48. Where the vehicle is equipped with a sliding gear type of transmission, it will be desirable that the transmission be in neutral at the time that any right-of-way signal is given. Accordingly, an energizing circuit for the signalling lamps will only be completed from the battery 40 only when the transmission is in neutral with the neutral switch 44 closed. Also, the motion actuated switch 46 may be mounted on any of the moving components of the vehicle such as the fan, the engine crankshaft or some transmission component in order to complete the energizing circuit for the signalling system only when the engine is in an idling condition. Operation of the signalling system may also be prevented whenever the accelerator pedal 34 is depressed. The switch 48 is therefore closed only when the accelerator pedal 34 is released as shown in FIGURE 2.

The vehicle battery 40 may be connected to the signalling lamps 22 upon closing of the relay switch 50 of the relay mechanism 52. The switch arm of the relay switch 50 is connected to the battery through the switches 48, 46, 44 and 36 aforementioned while the open contact of the relay switch 50 is connected to the signalling lamps through the flasher unit 30. Also connected in parallel with the signal lamps, is a grounded holding solenoid coil 54 which is energized upon closing of the relay switch 50 so as to thereafter maintain the relay switch closed. Once the relay switch is closed therefore, the signalling lamps 22 will flash until such time as the vehicle brakes are released and the vehicle begins to move forwardly. Initial closing of the relay switch 50 is however effected upon energization of the actuating solenoid coil 56 one terminal of which is connected to the battery through the switches actuated by the controls 32, 34, 44 and 46 aforementioned. The other terminal of the actuating coil 56 is adapted to be grounded in order to complete an energizing circuit therefor through the selective control switch 58 mounted on the dashboard of the vehicle for example.

The selective control switch 58 may be actuated by the driver when right-of-way signalling is desired. The switch 58 includes therefore a push button switch section 60 adapted to be illuminated by the indicator lamp 62 whenever the signalling lamps 22 are operating. The indicator lamp 62 is connected between ground and a terminal of the flasher unit 30.

From the foregoing description, the installation and operation of the right-of-way signalling system of the present invention will be apparent. It will therefore be appreciated that the right-of-way signalling devices 12 will be visible only from the sides of the vehicle and not from the front or rear thereof so that they will not be confused with the turn signals. Also, flashing operation of the signalling lamps will be initiated upon momentary closing of the push button switch 60, operation continuing until such time as the vehicle brakes are released. The signalling system also insures that operation thereof occurs only when the vehicle is under complete control of the driver. Motorists within vehicles approaching an intersection may thereby be reliably signalled that it is safe to proceed through the intersection.

The foregoing is considered as illustrative only of the principles of the invention.

What is claimed as new is as follows:

1. In combination wtih an automotive vehicle having a source of electrical energy, an engine controlled by an accelerator, a transmission driven by said engine and a brake pedal, a right-of-way signalling system comprising, a signal device mounted on the vehicle adjacent a forward end thereof for emitting signals directed laterally of the vehicle, relay means responsive to energization thereof for connecting said source of electrical energy to the signal device to operate the same, selectively operated control means connected to the relay means for controlling energization thereof, holding circuit means for maintaining the relay means energized upon actuation of the control means and signal cancelling switch means operatively connected to the brake pedal for disconnecting said source from the relay means when the brake pedal is release to disable operation of the signal device.

2. The combination of claim 1 including a flasher unit connecting said relay means to the signal device, and indicator means connected to the flasher unit for illuminating the selective control means during operation of the signal device.

3. The combination of claim 2 including means responsive to operation of said engine and connected to said relay means in series with the control means for controlling energization of the relay means from the source of electrical energy.

4. The combination of claim 3 wherein said engine operation responsive means includes a motion actuated switch.

5. The combination of claim 4 further including normally closed switch means in series with the motion actuated switch connecting the relay means to said source only when the accelerator is released.

6. The combination of claim 5 wherein said relay means includes an actuating coil electrically connected by the selective control means to said source, and a normally open relay switch connected in series with the signal device and said source and closed in response to energization of the actuating coil said holding circuit means including a holding coil connected to said source in parallel with the signal device upon closing of the relay switch to hold the same closed upon deenergization of the actuating coil.

7. The combination of claim 1 including means responsive to operation of said engine and connected to said relay means in series with the control means for controlling energization of the relay means from the source of electrical energy.

8. The combination of claim 1 further including normally closed switch means connecting the relay means to said source only when the accelerator is released.

9. The combination of claim 1 wherein said relay means includes an actuating coil electrically connected by the selective control means to said source, and a normally open relay switch connected in series with the signal device and said source and closed in response to energization of the actuating coil, said holding circuit means including a holding coil connected to said source in parallel with the signal device upon closing of the relay switch to hold the same closed upon deenergization of the actuating coil.

10. The combination of claim 9 including a flasher unit connecting said holding coil to the signal device, and indicator means connected to the flasher unit for illuminating the selective control means during operation of the signal device.

11. In combination with an automotive vehicle having a lighting system including forward headlights and a rear stop light energized from a source of electrical energy and driver operated controls including a brake pedal actuated to operate said stop light, a right-of-way signalling system comprising, a signal device, relay means connected to the signal device to operate the same when energized, selectively operated control means connected to the relay means, holding circuit means for maintaining the relay means energized upon actuation of the control means and signal cancelling switch means actuated simultaneously with said brake pedal for connecting said source to the relay means to deenergize the same upon release of the brake pedal.

12. The combination of claim 11 wherein said signal device includes a pair of signal lamps mounted on said vehicle substantially at the level of said headlights for emitting illumination directed laterally of the vehicle.

13. The combination of claim 12 including means operatively connected to another of said driver operated controls for disabling operation of the relay means.

14. The combination of claim 13 including a flasher unit connecting said relay means to the signal device, and indicator means connected to the flasher unit for illuminating the selective control means during operation of the signal device.

15. The combination of claim 11 including a flasher unit connecting said relay means to the signal device, and indicator means connected to the flasher unit for illuminating the selective control means during operation of the signal device.

References Cited

UNITED STATES PATENTS

| 3,273,117 | 9/1966 | Martauz | 340—81 |
| 3,281,786 | 10/1966 | Leichsenring | 340—72 X |
| 3,325,784 | 6/1967 | Erdelitsch et al. | 340—69 X |
| 3,364,384 | 1/1968 | Dankert | 340—66 X |

FOREIGN PATENTS 831,497   3/1960   Great Britain.

JOHN W. CALDWELL, Primary Examiner

K. N. LEIMER, Assistant Examiner

U.S. Cl. X.R.

340—81, 100